(12) United States Patent
Sannomiya et al.

(10) Patent No.: US 11,338,404 B2
(45) Date of Patent: May 24, 2022

(54) MACHINE TOOL AND CONTROL APPARATUS OF THE MACHINE TOOL

(71) Applicants: Citizen Watch Co., Ltd., Tokyo (JP); Citizen Machinery Co., Ltd., Nagano (JP)

(72) Inventors: Kazuhiko Sannomiya, Nagano (JP); Takaichi Nakaya, Nagano (JP)

(73) Assignees: CITIZEN WATCH CO., LTD., Tokyo (JP); CITIZEN MACHINERY CO., LTD, Nagano (JP)

( * ) Notice: Subject to any disclaimer, the term of this patent is extended or adjusted under 35 U.S.C. 154(b) by 356 days.

(21) Appl. No.: 15/512,989

(22) PCT Filed: Sep. 14, 2015

(86) PCT No.: PCT/JP2015/076008
§ 371 (c)(1),
(2) Date: Mar. 21, 2017

(87) PCT Pub. No.: WO2016/047485
PCT Pub. Date: Mar. 31, 2016

(65) Prior Publication Data
US 2017/0297159 A1 Oct. 19, 2017

(30) Foreign Application Priority Data
Sep. 22, 2014 (JP) .............................. JP2014-192950

(51) Int. Cl.
*B23Q 15/007* (2006.01)
*B23Q 15/013* (2006.01)
(Continued)

(52) U.S. Cl.
CPC .......... *B23Q 15/0075* (2013.01); *B23B 25/02* (2013.01); *B23B 29/125* (2013.01);
(Continued)

(58) Field of Classification Search
CPC .......... B23B 29/125; B23Q 5/22; B23Q 5/28; B23Q 5/32; B23Q 15/0075; B23Q 15/013;
(Continued)

(56) References Cited

U.S. PATENT DOCUMENTS 3,699,719 A * 10/1972 Rozdilsky ................. B24B 1/04
451/165
4,419,912 A * 12/1983 Sotome .................. B23B 29/125
82/11.1
(Continued)

FOREIGN PATENT DOCUMENTS

| JP | 2002-103101 A | 4/2002 | |
| JP | 2006-312223 A | 11/2006 | |
| WO | WO-2013069476 A1 * | 5/2013 | ........... B23B 29/125 |

OTHER PUBLICATIONS

Sannomiya et al., U.S. Appl. No. 15/129,238, filed Sep. 26, 2016 on Control Device for Machine Fool Including the Control Device.
(Continued)

*Primary Examiner* — Erica E Cadugan
*Assistant Examiner* — Michael Vitale
(74) *Attorney, Agent, or Firm* — Birch, Stewart, Kolasch & Birch, LLP (57) ABSTRACT

A machine tool and a control apparatus thereof include an amplitude control unit to control the amplitude of reciprocal vibration by a vibration unit. The amplitude control unit is configured to reduce the amplitude of the reciprocal vibration by the vibration unit as a cutting tool is fed in a feeding direction when the cutting tool reaches a predetermined cutting tool work stopping position on a workpiece in the feeding direction (Z-axis direction) to prevent the cutting tool from cutting the workpiece beyond the cutting tool work stopping position.

8 Claims, 5 Drawing Sheets

(51) Int. Cl.
*B23B 25/02* (2006.01)
*B23B 29/12* (2006.01)

(52) U.S. Cl.
CPC ........ *B23Q 15/013* (2013.01); *B23B 2270/30* (2013.01); *Y10S 82/904* (2013.01)

(58) Field of Classification Search
CPC .......... B23Q 2230/004; B23Q 2727/00; Y10S 82/904; Y10T 29/5155; Y10T 82/10; Y10T 82/12–149
USPC .......................... 82/904, 1.11, 1.2–16; 29/40
See application file for complete search history.

(56) References Cited

U.S. PATENT DOCUMENTS

| | | | | |
|---|---|---|---|---|
| 5,101,599 | A * | 4/1992 | Takabayasi | B06B 1/0261 173/11 |
| 5,911,802 | A * | 6/1999 | Kimura | B23B 25/02 408/17 |
| 7,234,379 | B2 * | 6/2007 | Claesson | B23B 27/002 188/380 |
| 10,414,009 | B2 * | 9/2019 | Kitakaze | B23B 25/02 |
| 10,414,010 | B2 * | 9/2019 | Sannomiya | B23B 25/02 |
| 10,610,993 | B2 * | 4/2020 | Nakaya | B23B 1/00 |
| 10,744,567 | B2 * | 8/2020 | Sannomiya | B23B 13/02 |
| 10,744,611 | B2 * | 8/2020 | Nakaya | G05B 19/416 |
| 2006/0099039 | A1 * | 5/2006 | Maki | B23B 29/125 408/1 R |
| 2007/0052326 | A1 * | 3/2007 | Liu | B23B 29/125 310/323.18 |
| 2009/0107308 | A1 * | 4/2009 | Woody | B23B 1/00 82/1.11 |
| 2013/0164092 | A1 * | 6/2013 | Kondo | G05B 19/404 409/132 |
| 2013/0309034 | A1 * | 11/2013 | Inagaki | B23Q 17/0976 409/132 |
| 2014/0102268 | A1 | 4/2014 | Hariki et al. | |
| 2014/0216216 | A1 * | 8/2014 | Hessenkamper | B23B 29/125 82/1.11 |
| 2016/0011579 | A1 | 1/2016 | Watanabe et al. | |

OTHER PUBLICATIONS

Kitakaze et al., U.S. Appl. No. 15/129,242, filed Sep. 26, 2016 on Control Device for Machine Tool and Machine Tool Including the Control Device.

Sannomiya et al., U.S. Appl. No. 15/506,793, filed Feb. 27, 2017 on Machine Tool and Control Apparatus of the Machine Tool.

* cited by examiner

MACHINE TOOL AND CONTROL APPARATUS OF THE MACHINE TOOL

FIELD OF THE INVENTION

The present invention relates to a machine tool that machines a workpiece while sequentially separating a chip generated during cutting work, and also relates to a control apparatus of the machine tool.

BACKGROUND OF THE INVENTION

There is a known conventional machine tool that includes a workpiece holding unit to hold a workpiece, a tool rest to hold a cutting tool for cutting the workpiece, a feeding unit to feed the cutting tool toward the workpiece in a predetermined feeding direction via relative movement between the workpiece holding unit and the tool rest, a vibration unit to relatively vibrate the work holding unit and the tool rest so that the cutting tool is fed in the feeding direction while reciprocally vibrating in the feeding direction, and a rotating unit to relatively rotate the workpiece and the cutting tool, wherein the cutting tool cuts the workpiece via the relative rotation between the workpiece and the cutting tool and via the feeding of the cutting tool toward the workpiece with the reciprocal vibration. An example of this conventional machine tool is described in Japanese Patent No. 5033929.

The above conventional machine tool, however, is configured to simply cut a workpiece while performing the reciprocal vibration, and is not configured to stop the cutting work at a predetermined cutting tool work stopping position. Thus, there is a problem that the cutting tool may continue the vibration and exceed the predetermined cutting tool work stopping position on the workpiece.

SUMMARY OF THE INVENTION

It is an object of the present invention to address the above problem of the conventional art, and to provide a machine tool that is capable of preventing a cutting tool from cutting a workpiece beyond a predetermined cutting tool work stopping position, and a control apparatus of the machine tool.

According to a first aspect of the present invention, the above problem is addressed by a machine tool comprising: a workpiece holding unit to hold a workpiece; a tool rest to hold a cutting tool for cutting the workpiece; a feeding unit to feed the cutting tool toward the workpiece in a predetermined feeding direction via relative movement between the workpiece holding unit and the tool rest; a vibration unit to relatively vibrate the workpiece holding unit and the tool rest so that the cutting tool is fed in the feeding direction while reciprocally vibrating in the feeding direction; and a rotating unit to relatively rotate the workpiece and the cutting tool, the machine tool being capable of cutting the workpiece via the relative rotation between the workpiece and the cutting tool and via the feeding of the cutting tool toward the workpiece with the reciprocal vibration in the feeding direction, wherein the machine tool comprises an amplitude control unit to control an amplitude of the reciprocal vibration by the vibration unit, and the amplitude control mean is configured to reduce the amplitude of the reciprocal vibration by the vibration unit while the cutting tool is fed in the feeding direction when the cutting tool reaches a predetermined cutting tool work stopping position on the workpiece in the feeding direction.

According to a second aspect of the present invention, the vibration unit relatively vibrates the workpiece holding unit and the tool rest so that a cutting work position of the forward movement of the reciprocal vibration overlaps with a cutting work position of the backward movement of the reciprocal vibration, and the vibration unit and the amplitude control unit cooperate so that the amplitude of the reciprocal vibration is reduced while the overlap of the cutting work position of the forward movement of the reciprocal vibration with the cutting work position of the backward movement of the reciprocal vibration is maintained.

According to a third aspect of the present invention, the amplitude control unit is configured to start reducing the amplitude when the cutting tool in the forward movement reaches the cutting tool work stopping position and to reduce the amplitude by gradually changing the position of the cutting tool as the backward movement switches to the forward movement while maintaining the position of the cutting tool as the forward movement switches to the backward movement on the cutting tool work stopping position.

According to a fourth aspect of the present invention, the amplitude control unit is configured to start reducing the amplitude when the cutting tool reaches any predetermined position located in front of the cutting tool work stopping position on the workpiece and to reduce the amplitude so that the position of the cutting tool as the forward movement switches to the backward movement reaches the cutting tool work stopping position to end the reciprocal vibration.

According to a fifth aspect of the present invention, the amplitude control unit is configured to stop the reciprocal vibration by the vibration unit so that, after the cutting tool reaches the cutting tool work stopping position and the reciprocal vibration is performed for a predetermined number of times while the amplitude is reduced, the cutting tool cuts the workpiece while being maintained at the cutting tool work stopping position.

According to a sixth aspect of the present invention, the above problem is addressed by a control apparatus provided in a machine tool comprising: a workpiece holding unit to hold a workpiece; a tool rest to hold a cutting tool for cutting the workpiece; a feeding unit to feed the cutting tool toward the workpiece in a predetermined feeding direction via relative movement between the workpiece holding unit and the tool rest; a vibration unit to relatively vibrate the workpiece holding unit and the tool rest so that the cutting tool is fed in the feeding direction while reciprocally vibrating in the feeding direction; and a rotating unit to relatively rotate the workpiece and the cutting tool, the machine tool being capable of cutting the workpiece via the relative rotation between the workpiece and the cutting tool and via the feeding of the cutting tool toward the workpiece with the reciprocal vibration in the feeding direction, wherein the control apparatus comprises an amplitude control unit to control an amplitude of the reciprocal vibration by the vibration unit, and the amplitude control unit is configured to reduce the amplitude of the reciprocal vibration by the vibration unit while the cutting tool is fed in the feeding direction when the cutting tool reaches a predetermined cutting tool work stopping position on the workpiece in the feeding direction.

According to the machine tool of the first aspect of the present invention, the amplitude of the reciprocal vibration is reduced by the amplitude control unit when the cutting tool reaches the cutting tool work stopping position. Thus, it is possible to prevent the cutting tool to cut the workpiece beyond the cutting tool work stopping position. Also, because the amplitude of the reciprocal vibration becomes smaller, the surface of the workpiece created with the vibration cutting can be smoothly finished as the cutting tool comes closer to the cutting tool work stopping position.

According to the machine tool of the second aspect of the present invention, it is possible to machine the workpiece while separating a chip generated from the workpiece at a portion where the cutting work position of the forward movement of the reciprocal vibration overlaps with the cutting work position of the backward movement of the reciprocal vibration.

As in the machine tool of the third aspect of the present invention, the amplitude control unit may be configured to start reducing the amplitude when the cutting tool in the forward movement reaches the cutting tool work stopping position and to reduce the amplitude by gradually changing the position of the cutting tool as the backward movement switches to the forward movement while maintaining the position of the cutting tool as the forward movement switches to the backward movement on the cutting tool work stopping position.

As in the machine tool of the fourth aspect of the present invention, the amplitude control unit may be configured to start reducing the amplitude when the cutting tool reaches any predetermined position located in front of the cutting tool work stopping position on the workpiece and to reduce the amplitude so that the position of the cutting tool as the forward movement switches to the backward movement reaches the cutting tool work stopping position to end the reciprocal vibration.

According to the machine tool of the fifth aspect of the present invention, the surface of the workpiece at the cutting tool work stopping position, which is in a wavy shape due to the reciprocal vibration, can be finished flat.

According to the control apparatus of a machine tool of the sixth aspect of the present invention, the same effects achieved by the first aspect of the present invention can also be achieved by the control apparatus of a machine tool.

DETAILED DESCRIPTION OF THE PREFERRED EMBODIMENTS

A machine tool and a control apparatus of the machine tool according to an aspect of the present invention may be embodied in any manner as long as the machine tool or the control apparatus includes an amplitude control unit to control an amplitude of the reciprocal vibration by the vibration unit, and the amplitude control unit is configured to reduce the amplitude of the reciprocal vibration by the vibration unit while the cutting tool is fed in the feeding direction when the cutting tool reaches a predetermined cutting tool work stopping position on the workpiece in the feeding direction, so as to prevent the cutting tool from cutting the workpiece beyond the cutting tool work stopping position.

Figure 1:
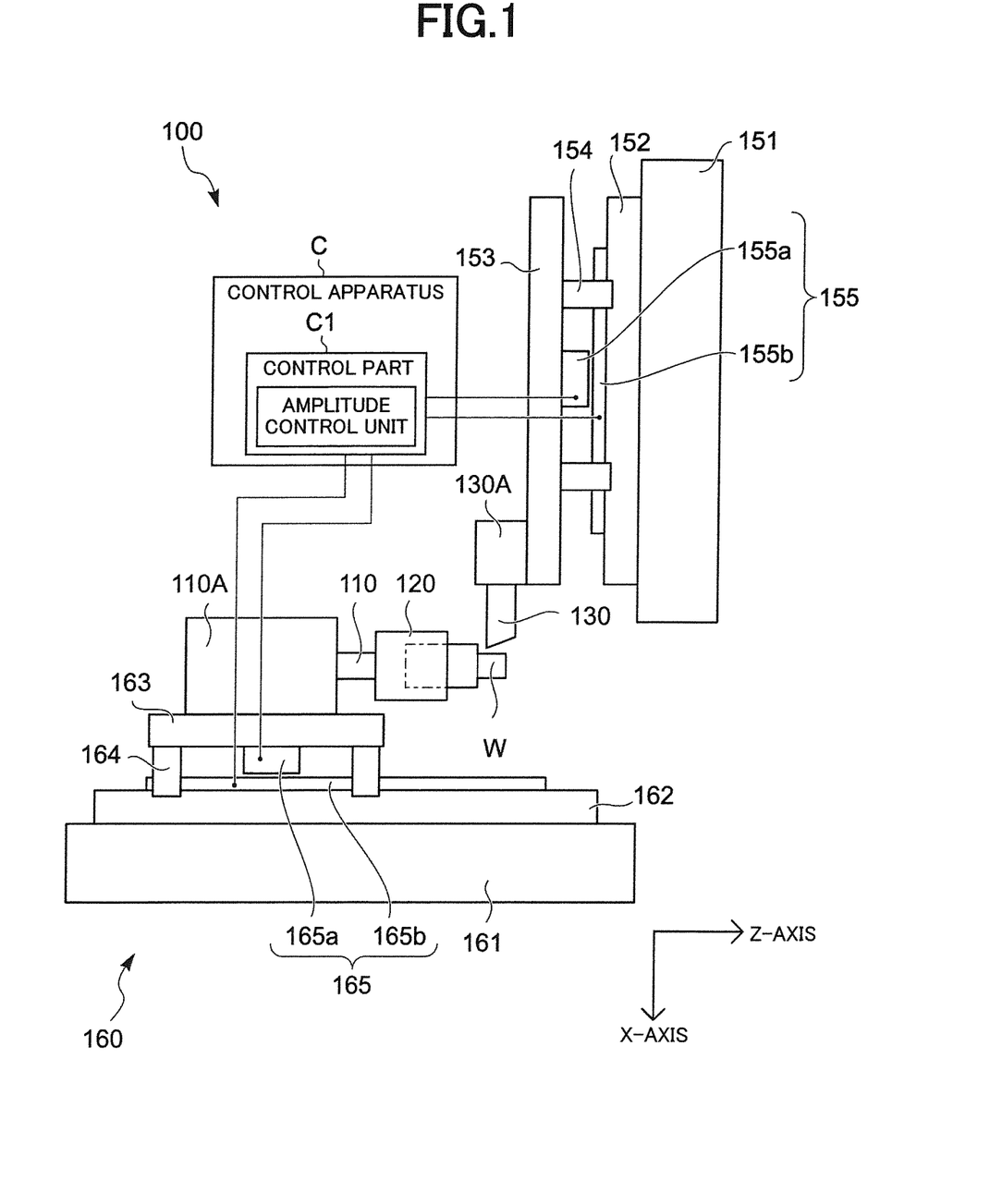
FIG. 1 is a schematic diagram illustrating a machine tool of a first embodiment of the present invention.

FIG. 1 is a diagram illustrating a machine tool 100 having a control apparatus C that is a first embodiment of the present invention.

The machine tool 100 includes a spindle 110 and a cutting tool rest 130A. The spindle 110 has a chuck 120 provided at a tip thereof. A workpiece W is held by the spindle 110 via the chuck 120, and the spindle 110 is configured as a workpiece holding unit to hold a workpiece. The spindle 110 is supported by a spindle stock 110A so as to be rotatably driven by a spindle motor that is not shown. As the spindle motor, a conventional built-in motor or the like formed between the spindle stock 110A and the spindle 110 may be used in the spindle stock 110A.

The spindle stock 110A is mounted on a bed side of the machine tool 100 so as to be movable in a Z-axis direction, which is an axis direction of the spindle 110, by a Z-axis direction feeding mechanism 160. The spindle 110 moves in the Z-axis direction by the Z-axis direction feeding mechanism 160 via the spindle stock 110A. The Z-axis direction feeding mechanism 160 constitutes a spindle moving mechanism for moving the spindle 110 in the X-axis direction.

The Z-axis direction feeding mechanism 160 includes a base 161, which is integral with a side on which the Z-axis direction feeding mechanism 160 is fixed, such as the bed side, and a Z-axis direction guide rail 162 provided on the base 161 so as to extend in the Z-axis direction. A Z-axis direction feeding table 163 is slidably supported on the Z-axis direction guide rail 162 via a Z-axis direction guide 164. A mover 165a of a linear servo motor 165 is provided on the side of the Z-axis direction feeding table 163, and a stator 165b of the linear servo motor 165 is provided on the side of the base 161.

The spindle stock 110A is mounted on the Z-axis direction feeding table 163, and the Z-axis direction feeding table 163 is driven by the linear servo motor 165 to move in the Z-axis direction. Due to the movement of the Z-axis direction feeding table 163, the spindle stock 110A moves in the Z-axis direction, making the spindle 110 move in the X-axis direction.

A cutting tool 130, such as a bite, for cutting the workpiece W is attached to the cutting tool rest 130A. The cutting tool rest 130A constitutes a tool rest that holds the cutting tool 130.

The cutting tool rest 130A is provided on a bed side of the machine tool 100 so as to be movable in an X-axis direction, which is perpendicular to the Z-axis direction, and in a Y-axis direction, which is perpendicular to both the Z-axis direction and the X-axis direction, by an X-axis direction feeding mechanism 150 and a Y-axis direction feeding mechanism that is not illustrated.

The X-axis direction feeding mechanism 150 and the Y-axis direction feeding mechanism constitute a tool rest moving mechanism for moving the cutting tool rest 130A in the X-axis direction and the Y-axis direction with respect to the spindle 110.

The X-axis direction feeding mechanism 150 includes a base 151, which is integral with a side on which the X-axis direction feeding mechanism 150 is fixed, and an X-axis direction guide rail 152 provided on the base 151 so as to extend in the X-axis direction. An X-axis direction feeding table 153 is slidably supported on the X-axis direction guide rail 152 via an X-axis direction guide 154.

A mover 155a of a linear servo motor 155 is provided on the side of the X-axis direction feeding table 153, and a stator 155b of the linear servo motor 155 is provided on the side of the base 151. The X-axis direction feeding table 153 is driven by the linear servo motor 155 to move in the X-axis direction.

The Y-axis direction feeding mechanism is structurally similar to the X-axis direction feeding mechanism 150, except being arranged in the Y-axis direction. Thus, the detailed description and illustration of the Y-axis direction feeding mechanism are omitted.

In FIG. 1, the X-axis direction feeding mechanism 150 is mounted on the bed side via the Y-axis direction feeding mechanism that is not shown, and the cutting tool rest 130A is mounted on the X-axis direction feeding table 153. The cutting tool rest 130A moves in the X-axis direction by being driven by the X-axis direction feeding table 153, and also moves in the Y-axis direction by being driven by the Y-axis direction feeding mechanism, which operates similarly to the X-axis direction feeding mechanism 150.

Alternatively, the Y-axis direction feeding mechanism that is not shown may be mounted on the bed side via the X-axis direction feeding mechanism 150, and the cutting tool rest 130A may be mounted on the side of the Y-axis direction feeding mechanism. The structure for moving the cutting tool rest 130A in the X-axis direction and the Y-axis direction by the X-axis direction feeding mechanism and the Y-axis direction feeding mechanism 150 is conventionally known and thus the detailed description and illustration of the structure are omitted.

The tool rest moving mechanism (the X-axis direction feeding mechanism 150 and the Y-axis direction feeding mechanism) and the spindle moving mechanism (the Z-axis direction feeding mechanism 160) operate cooperatively, and the cutting tool 130 attached to the cutting tool rest 130A is fed in any feeding direction with respect to the workpiece W via the movement of the cutting tool rest 130A in the X-axis direction and the Y-axis direction by the X-axis direction feeding mechanism 150 and the Y-axis direction feeding mechanism as well as via the movement of the spindle stock 110A (the spindle 110) in the Z-axis direction by the Z-axis direction feeding mechanism 160.

Figure 2:
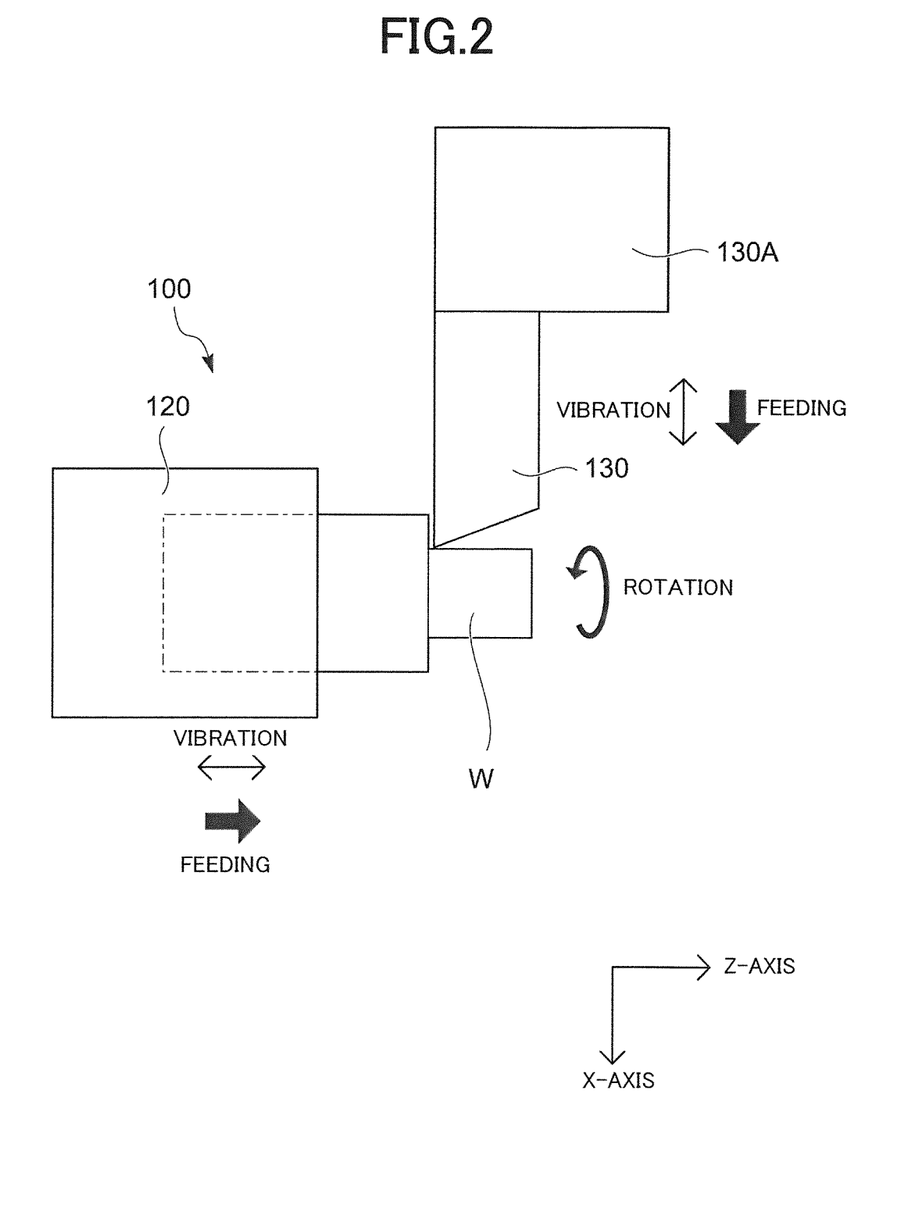
FIG. 2 is a schematic diagram illustrating the relationship between a cutting tool and a workpiece in the first embodiment of the present invention.

As illustrated in FIG. 2, the workpiece W is cut with the cutting tool 130 into any shape by feeding the cutting tool 130 in any feeding direction with respect to the workpiece W by a feeding unit consisting of the spindle moving mechanism (the Z-axis direction feeding mechanism 160) and the tool rest moving mechanism (the X-axis direction feeding mechanism 150 and the Y-axis direction feeding mechanism).

In this embodiment, both the spindle stock 110A and the cutting tool rest 130A are movable. Alternatively, the spindle stock 110A may be fixed on the bed side of the machine tool 100 and the tool rest moving mechanism may be configured to move the cutting tool rest 130A in the X-axis direction, the Y-axis direction, and the Z-axis direction.

In the latter case, the feeding unit may be consist of the tool rest moving mechanism that moves the cutting tool rest 130A in the X-axis direction, the Y-axis direction, and the Z-axis direction, and the cutting tool 130 may be fed toward the workpiece W by moving the cutting tool rest 130A with respect to the spindle 110 that is fixedly positioned and rotatably driven.

Also, the cutting tool rest 130A may be fixed on the bed side of the machine tool 100 so as to be not movable and the spindle moving mechanism may be configured to move the spindle stock 110A in the X-axis direction, the Y-axis direction, and the Z-axis direction. In this case, the feeding unit may be consist of the spindle moving mechanism that moves the spindle stock 110A in the X-axis direction, the Y-axis direction, and the Z-axis direction, and the cutting tool 130 may be fed toward the workpiece W by moving the spindle stock 110A with respect to the cutting tool rest 130A that is fixedly positioned.

Although the X-axis direction feeding mechanism 150, the Y-axis direction feeding mechanism, and the Z-axis direction feeding mechanism 160 are configured to be driven by a linear servo motor in this embodiment, they may be driven by a conventional mechanism consisting of a ball screw and a servo motor, for example.

In this embodiment, a rotating unit to relatively rotate the workpiece W and the cutting tool 130 consists of the spindle motor such as the built-in motor, and the relative rotation between the workpiece W and the cutting tool 130 is achieved by rotatably driving the spindle 110. Although the present embodiment is configured so that the workpiece W is rotated with respect to the cutting tool 130, the cutting tool 130 may be rotated with respect to the workpiece W. In the latter case, a rotating tool such as a drill may be used as the cutting tool 130.

The rotation of the spindle 110, the Z-axis direction feeding mechanism 160, the X-axis direction feeding mechanism 150, and the Y-axis direction feeding mechanism are driven and controlled by a control part C1 of the control apparatus C.

The control part C1 is preconfigured to control so that the spindle stock 110A or the cutting tool rest 130A moves in any one of the X-axis direction, the Y-axis direction, and the Z-axis direction while the spindle 110 or the cutting tool 130 reciprocally vibrates in the any one of the X-axis direction, the Y-axis direction, and the Z-axis direction by utilizing one of the feeding mechanisms as a vibration unit.

Figure 3:
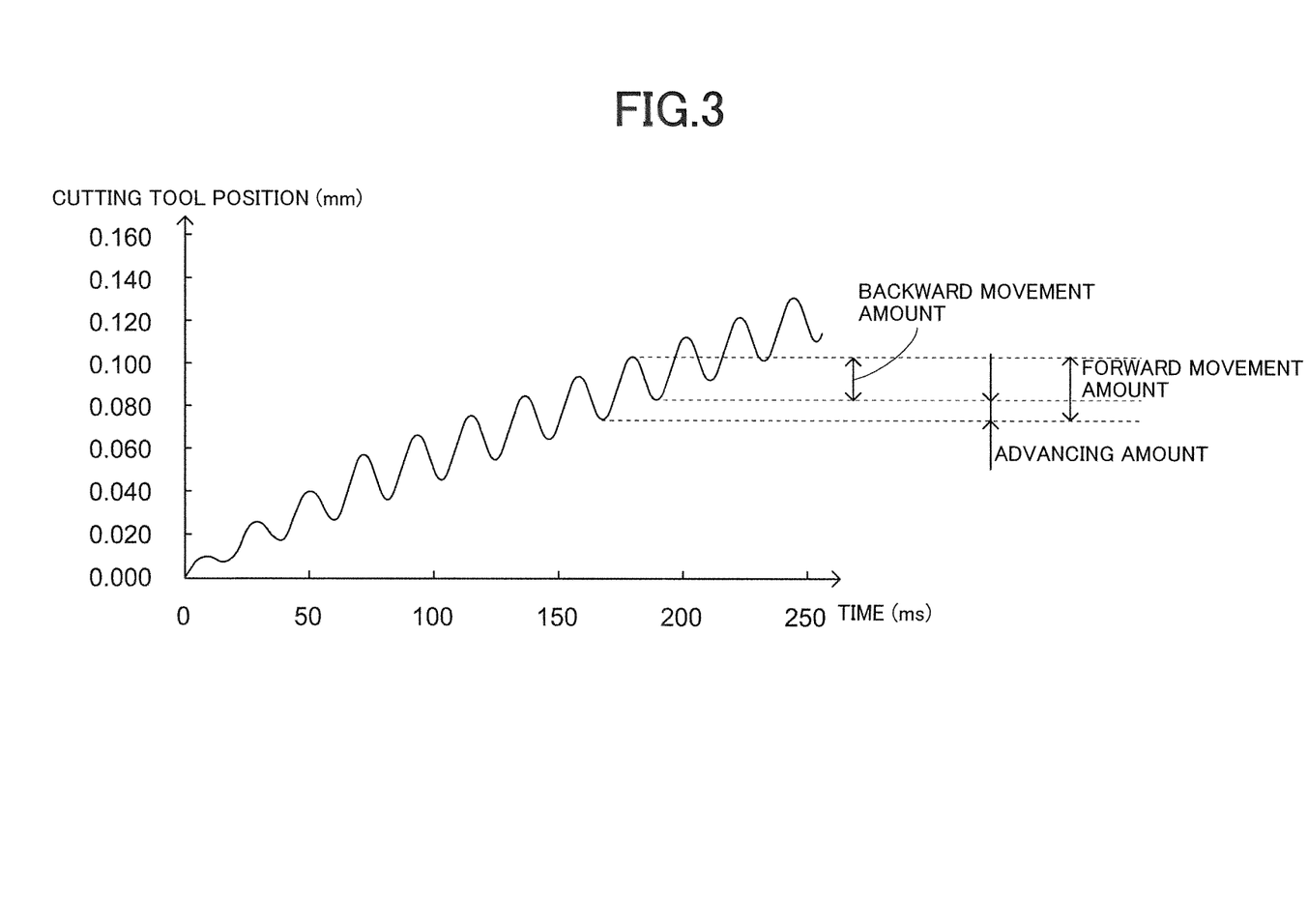
FIG. 3 is a diagram illustrating the reciprocal vibration and position of the cutting tool in the first embodiment of the present invention.

As illustrated in FIG. 3, due to the control of the control part C1, each of the feeding mechanisms forwardly moves the spindle 110 or the cutting tool rest 130A (forward movement) for a predetermined forward movement amount and then backwardly moves the spindle 110 or the cutting tool rest 130A (backward movement) for a predetermined backward movement amount in each reciprocal vibration, so that the spindle 110 or the cutting tool rest 130A moves in a respective direction for an advancing amount that is equal to the difference between the forward movement amount and the backward movement amount. By doing so, the feeding mechanisms cooperatively feed the cutting tool 130 toward the workpiece W in any feeding direction.

Due to the Z-axis direction feeding mechanism 160, the X-axis direction feeding mechanism 150, and the Y-axis direction feeding mechanism, the machine tool 100 machines the workpiece W by feeding the cutting tool 130 in a feeding direction while reciprocally vibrating the cutting tool 130 in the feeding direction.

Figure 4:
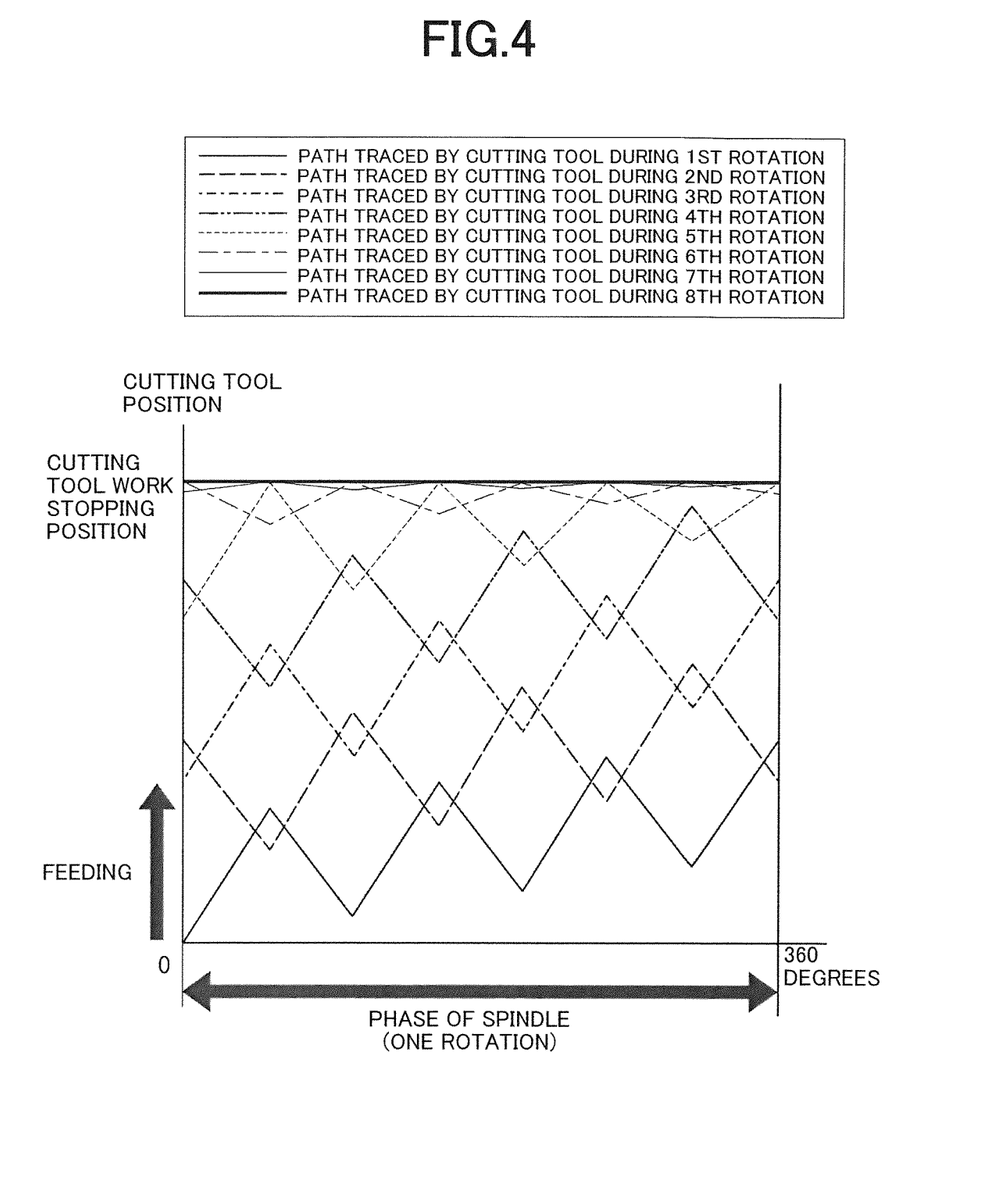
FIG. 4 is a conceptual diagram illustrating the cutting work as the cutting work ends in the first embodiment.

If the spindle stock 110A (spindle 110) or the cutting tool rest 130A (cutting tool 130) moves with the reciprocal vibration while the workpiece W rotates to machine the workpiece W with the cutting tool 130 into a predetermined shape, a circumferential surface of the workpiece W is cut as illustrated in FIG. 4.

One example will now be described in which the number of vibrations N of the spindle stock 110A (spindle 110) or the cutting tool rest 130A with respect to one rotation of the workpiece W is 3.5 (the number of vibrations N=3.5), as illustrated in FIG. 4.

In this case, the phase of the shape of the circumferential surface of the workpiece W cut with the cutting tool 130 during the n+1th rotation of the workpiece W (n is an integer equal to or larger than one) is opposite to the phase of the shape of the circumferential surface of the workpiece W cut with the cutting tool 130 during the nth rotation of the workpiece W. Thus, a cutting work position of the forward movement of the cutting tool 130 during the nth rotation of the workpiece W partially overlaps with a cutting work position of the backward movement of the cutting tool 130 during the n+1th rotation of the workpiece W. This means that a portion of the circumferential surface of the workpiece W that is cut during the n+1th rotation includes a portion that has already been cut during the nth rotation. In this portion, the cutting tool 130 performs an air cut, in which the cutting tool 130 does not cut the workpiece W at all.

Due to this air cut, a chip generated from the workpiece W during a cutting work is sequentially separated. Thus, the machine tool 100 can smoothly machine an outer surface of the workpiece W, for example, while separating a chip via the reciprocal vibration of the cutting tool 130 in a feeding direction.

In order to sequentially separate a chip via the reciprocal vibration of the cutting tool 130, a portion of the circumferential surface of the workpiece W that is cut during the n+1th rotation simply needs to include a portion that has already been cut during the nth rotation. In other words, a path traced by the cutting tool 130 on the circumferential surface of the workpiece W in the backward movement during the n+1th rotation of the workpiece W simply needs to reach a path traced by the cutting tool 130 on the circumferential surface of the workpiece W during the nth rotation of the workpiece W.

As illustrated in FIG. 4, the phase of the shape of the circumferential surface of the workpiece W cut with the cutting tool 130 during the n+1th rotation of the workpiece W simply needs to be not coincident with (not the same as) the phase of the shape of the circumferential surface of the workpiece cut with the cutting tool 130 during the nth rotation of the workpiece W, and do not need to be a 180 degrees inversion of the phase of the shape of the circumferential surface of the workpiece cut with the cutting tool 130 during the nth rotation of the workpiece W.

Machining with the cutting tool 130 is performed via a move instruction to move the cutting tool 130 to a particular coordinate position. Due to this move instruction, the cutting tool 130 moves to and stops at a coordinate position (cutting tool work stopping position) specified in the move instruction.

A cutting work performed when the cutting tool 130 reaches the cutting tool work stopping position will now be described.

Suppose that the cutting tool 130 machines the workpiece W by being fed toward the workpiece W in a feeding direction while reciprocally vibrating in the feeding direction as the workpiece W rotates, and that the cutting tool 130 reaches the cutting tool work stopping position in the forward movement thereof during the fifth rotation of the workpiece W.

In this case, the control part C1 includes, and functions as, an amplitude control unit. Due to the control performed by the control part C1, the reciprocal vibration is performed while a predetermined amplitude is maintained during the first to fourth rotations of the workpiece W. During the fifth rotation of the workpiece W, the amplitude of the reciprocal vibration by the vibration unit starts reducing while the position of the cutting tool 130 as the forward movement switches to the backward movement is maintained on the cutting tool work stopping position. During the sixth and seventh rotations of the workpiece W, the cutting work is performed as the position of the cutting tool 130 as the backward movement switches to the forward movement is gradually changed.

In this case, the amplitude of the reciprocal vibration by the vibration unit while the cutting tool 130 is fed in a feeding direction is reduced while the path traced by the cutting tool 130 in the backward movement during the n+1th rotation of the workpiece W reaches the path traced by the cutting tool 130 during the nth rotation of the workpiece W. In other words, the vibration unit vibrates the cutting tool 130 so that the cutting work position of the forward movement of the reciprocal vibration overlaps with the cutting work position of the backward movement of the reciprocal vibration to cut the workpiece W while the control part C1, functioning as an amplitude control unit reduces the amplitude of the reciprocal vibration as the cutting tool 130 is fed in the feeding direction. Thus, the amplitude becomes smaller while a chip is sequentially separated.

Then, during the last, or 8th, rotation of the workpiece W, due to the control performed by the control part C1, the reciprocal vibration by the vibration unit stops so that the cutting tool 130 cuts the workpiece W while being maintained at the cutting tool work stopping position. Thus, the surface of the workpiece W at the cutting tool work stopping position can be smoothly finished.

In the example illustrated in FIG. 4, the vibration frequency of the reciprocal vibration during the first to seventh rotations of the workpiece W is kept constant. The vibration frequency, however, may not be constant as long as the path traced by the cutting tool 130 on the circumferential surface of the workpiece in the backward movement during the n+1th rotation of the workpiece W reaches the path traced by the cutting tool 130 on the circumferential surface of the workpiece during the nth rotation of the workpiece W.

The machine tool 100 and the control apparatus C of the machine tool 100 as the first embodiment of the present invention obtained as described above includes the control part C1, which includes, and functions as, an amplitude control unit, to control the amplitude of the reciprocal vibration by the vibration unit, and the amplitude control unit is configured to reduce the amplitude of the reciprocal vibration by the vibration unit while the cutting tool 130 is fed in the feeding direction when the cutting tool 130 reaches the cutting tool work stopping position on the workpiece W. Thus, it is possible to prevent the cutting tool from cutting the workpiece W beyond the cutting tool work stopping position by reducing the amplitude of the reciprocal vibration and to smoothly finish the surface of the workpiece W created with the vibration cutting as the cutting tool comes closer to the cutting tool work stopping position.

Also, the amplitude control unit in control part C1 can be configured to start reducing the amplitude when the cutting tool 130 in the forward movement reaches the cutting tool work stopping position and to reduce the amplitude by gradually changing the position of the cutting tool 130 as the backward movement switches to the forward movement while maintaining the position of the cutting tool 130 as the forward movement switches to the backward movement on the cutting tool work stopping position.

Also, the amplitude control unit in control part C1 can stop the reciprocal vibration by the vibration unit so that, after the cutting tool 130 reaches the cutting tool work stopping position and the reciprocal vibration is performed for a predetermined number of times while the amplitude is reduced, the cutting tool 130 cuts the workpiece W while being maintained at the cutting tool work stopping position.

Thus, the surface of the workpiece W at the cutting tool work stopping position, which is in a wavy shape due to the reciprocal vibration, can be finished flat.

A second embodiment of the present invention will now be described. The description will be mainly focused on configurations that are different from those of the first embodiment for avoiding duplication of description.

Figure 5:
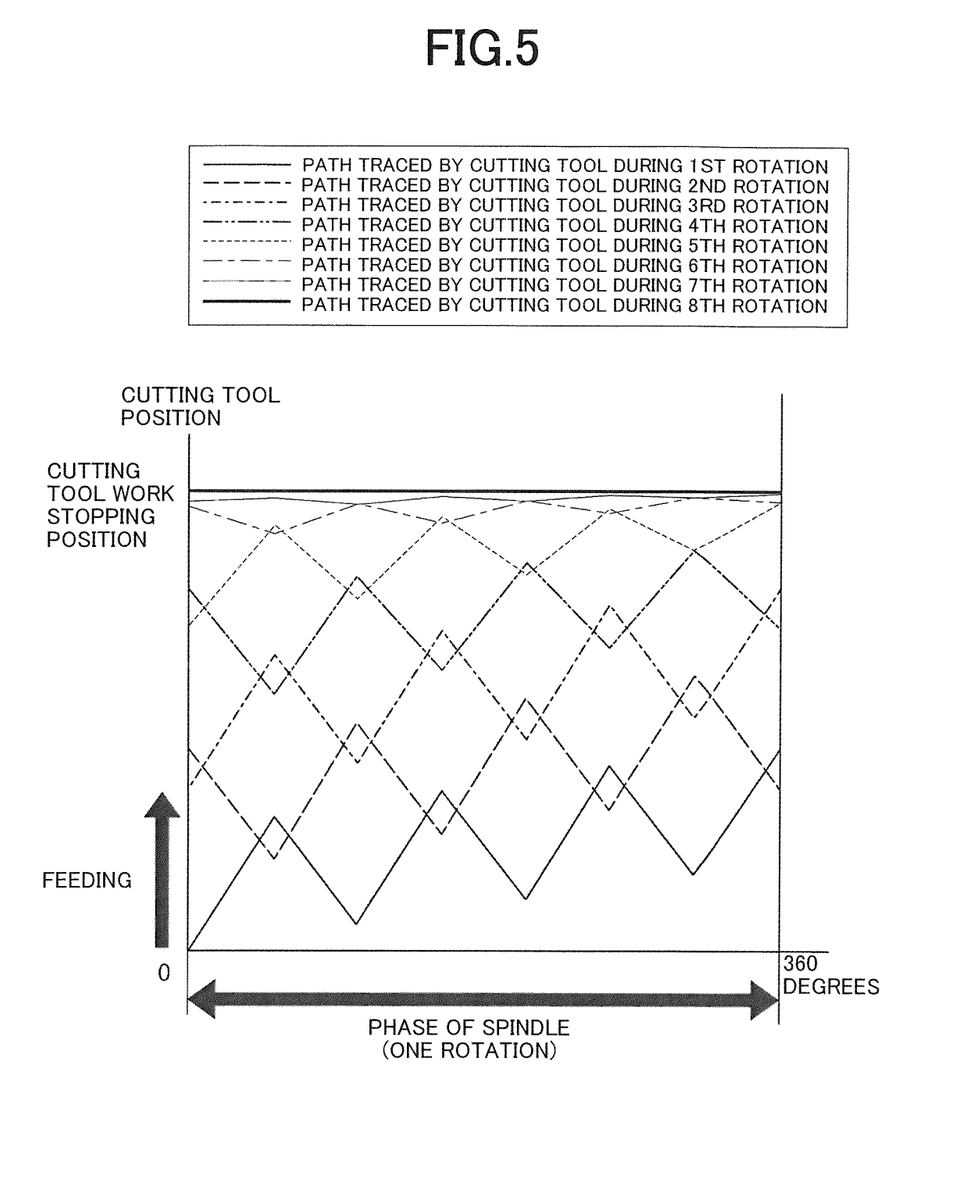
FIG. 5 is a conceptual diagram illustrating the cutting work as the cutting work ends in the second embodiment.

As illustrated in FIG. 5, in the second embodiment, the amplitude control unit in control part C1 is configured to start reducing the amplitude when the cutting tool 130 reaches any predetermined position located in front of the cutting tool work stopping position for performing the cutting work during the fifth to seventh rotations of the workpiece W while the amplitude is reduced, and to reduce the amplitude so that the position of the cutting tool 130 as the forward movement switches to the backward movement at the end of the seventh rotation reaches the cutting tool work stopping position to end the reciprocal vibration. During the eighth rotation of the workpiece W, the cutting tool 130 cuts the workpiece W while being located at the cutting tool work stopping position without the reciprocal vibration.

The machine tool 100 and the control apparatus C of the machine tool 100 as the second embodiment of the present invention obtained as described above includes the amplitude control unit in control part C1, that is configured to start reducing the amplitude when the cutting tool 130 reaches any predetermined position located in front of the cutting tool work stopping position on the workpiece W and to reduce the amplitude so that the position of the cutting tool 130 as the forward movement switches to the backward movement reaches the cutting tool work stopping position to end the reciprocal vibration. Thus, the same effects as the first embodiment can be achieved.

In both of the above embodiments, the reciprocal vibration is performed by the vibration unit such that the forward movement is performed for a predetermined forward movement amount and then the backward movement is performed for a predetermined backward movement amount. Alternatively, the reciprocal vibration may be performed by repeating relative movement at a first speed as the forward movement and relative movement at a second speed as the backward movement, wherein the second speed is set to zero to stop the reciprocal vibration.

Also, the relative movement at the second speed may be performed in the same direction as the relative movement at a speed slower than the first speed. In this case, when the relative movement at the first speed and the relative movement at the second speed are repeated in a feeding direction to repetitively move the spindle 110 and the cutting tool rest 130A in a mutually relative manner, the amplitude of one repetitive movement is reduced as described above so that a maximum movement position of the cutting tool 130 in the forward movement of one repetitive movement does not go beyond the cutting tool work stopping position.

In either of the above cases, a chip generated from the workpiece W can be easily folded and separated into chip powder at a portion of the chip where the width of the chip become narrower.

The invention claimed is:
1. A machine tool comprising:
a workpiece holder holding a workpiece;
a tool rest to hold a cutting tool for cutting the workpiece;
a feeder feeding the cutting tool toward the workpiece in a predetermined feeding direction via relative movement between the workpiece holder and the tool rest;
a vibrator relatively vibrating the workpiece holder and the tool rest so that the cutting tool is fed in the feeding direction while reciprocally vibrating in the feeding direction; and
a rotator relatively rotating the workpiece and the cutting tool,
the machine tool being capable of cutting the workpiece via the relative rotation between the workpiece and the cutting tool and via the feeding of the cutting tool toward the workpiece with the reciprocal vibration in the feeding direction,
wherein the machine tool comprises an amplitude controller controlling an amplitude of the reciprocal vibration by the vibrator, and
the amplitude controller is configured to reduce the amplitude of the reciprocal vibration by the vibrator while the cutting tool is fed in the feeding direction when the cutting tool reaches a particular coordinate position on the workpiece in the feeding direction.

2. The machine tool according to claim 1, wherein the vibrator relatively vibrates the workpiece holder and the tool rest so that a cutting work position of a forward movement of the reciprocal vibration overlaps with a cutting work position of a backward movement of the reciprocal vibration, and the vibrator and the amplitude controller cooperate so that the amplitude of the reciprocal vibration is reduced while the overlap of the cutting work position of the forward movement of the reciprocal vibration with the cutting work position of the backward movement of the reciprocal vibration is maintained.

3. The machine tool according to claim 1, wherein the amplitude controller controls the cutting tool to first positions, where a backward movement switches to a forward movement, and second positions, where the forward movement switches to the backward movement, closer to the particular coordinate position until one of the second positions reaches the particular coordinate position, and when the one of the second positions reaches the particular coordinate position for a first time, the amplitude controller maintains the second positions at the particular coordinate position thereafter while gradually reducing the amplitude by bringing the first positions closer to the particular coordinate position.

4. The machine tool according to claim 1, wherein the amplitude controller is configured to start reducing the amplitude when the cutting tool reaches any predetermined position located in front of the particular coordinate position on the workpiece and to reduce the amplitude so that the position of the cutting tool, as a forward movement switches to a backward movement, reaches the particular coordinate position to end the reciprocal vibration.

5. The machine tool according to claim 1, wherein the amplitude controller is configured to stop the reciprocal vibration by the vibrator so that, after the cutting tool reaches the particular coordinate position and the reciprocal vibration is performed for a predetermined number of times while the amplitude is reduced, the cutting tool cuts the workpiece while being maintained at the particular coordinate position.

6. The machine tool according to claim 1, wherein the particular coordinate position is specified in a particular move instruction to move the cutting tool in the feeding direction.

7. A control apparatus provided in a machine tool comprising:
a workpiece holder holding a workpiece;
a tool rest to hold a cutting tool for cutting the workpiece;

a feeder feeding the cutting tool toward the workpiece in a predetermined feeding direction via relative movement between the workpiece holder and the tool rest;

a vibrator relatively vibrating the workpiece holder and the tool rest so that the cutting tool is fed in the feeding direction while reciprocally vibrating in the feeding direction; and a rotator relatively rotating the workpiece and the cutting tool, the machine tool being capable of cutting the workpiece via the relative rotation between the workpiece and the cutting tool and via the feeding of the cutting tool toward the workpiece with the reciprocal vibration in the feeding direction, wherein the control apparatus comprises an amplitude controller controlling an amplitude of the reciprocal vibration by the vibrator, and the amplitude controller is configured to reduce the amplitude of the reciprocal vibration by the vibrator while the cutting tool is fed in the feeding direction when the cutting tool reaches a particular coordinate position on the workpiece in the feeding direction.

8. The control apparatus according to claim 7, wherein the particular coordinate position is specified in a particular move instruction to move the cutting tool in the feeding direction.

* * * * *